Sept. 24, 1968          J. L. MOSAK          3,403,321
       HIGH EFFICIENCY VOLTAGE REGULATING CIRCUIT
                  Filed Nov. 14, 1966
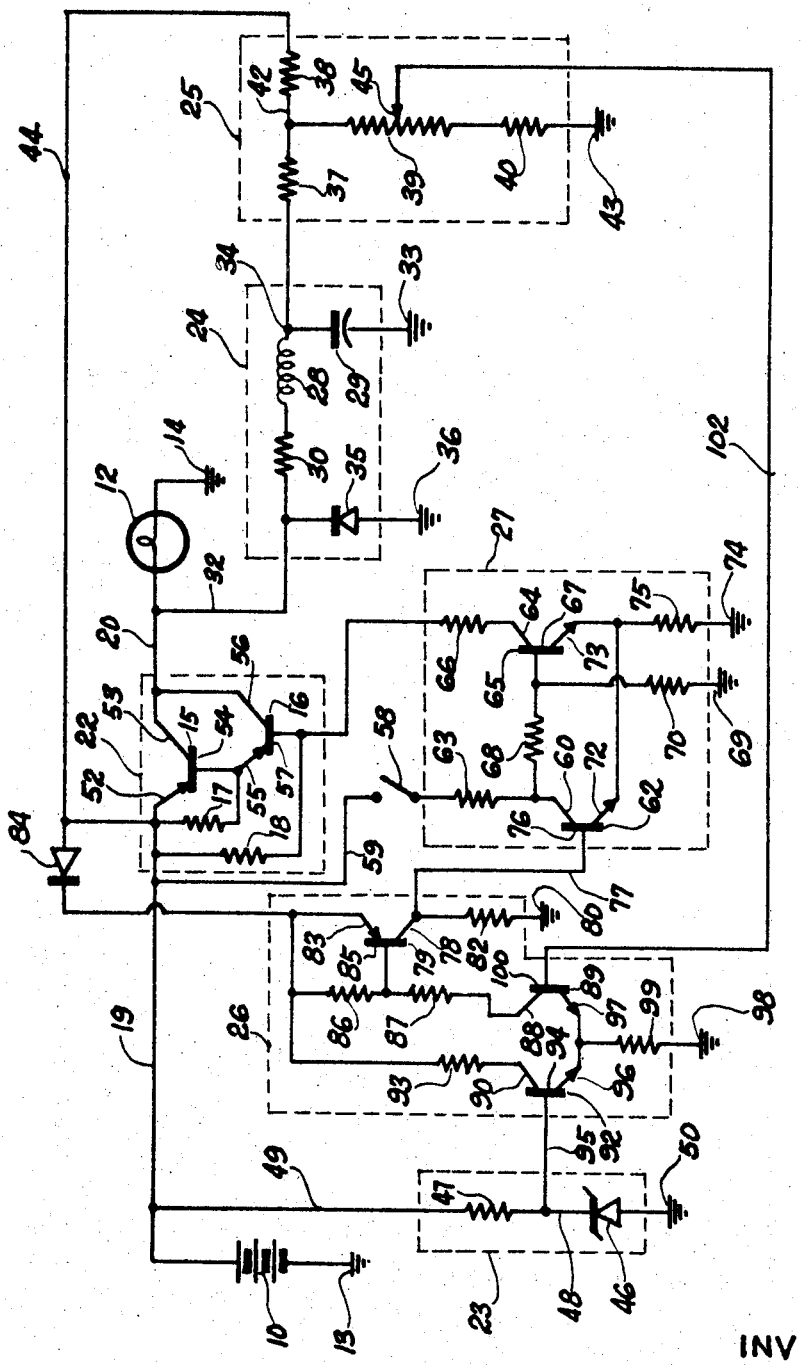
INVENTOR
Joel L. Mosak
Atty

United States Patent Office 3,403,321
Patented Sept. 24, 1968

3,403,321
HIGH EFFICIENCY VOLTAGE REGULATING CIRCUIT
Joel L. Mosak, Glenview, Ill., assignor to Vapor Corporation, Chicago, Ill., a corporation of Delaware
Filed Nov. 14, 1966, Ser. No. 593,771
15 Claims. (Cl. 323—20)

This invention relates to a high efficiency voltage regulating circuit adapted to the maintenance of a relatively uniform R.M.S. voltage supply for a predetermined load, and in which circuit, power losses are minimized by minimizing resistance or loss type control elements which are required to carry appreciable current in comparison to that carried by the load and by the use of low loss and practically instantaneous solid state control devices which function together and in cooperative relationships to accomplish the ultimately desired control with extremely low electrical losses.

As a basic point of understanding, it is pointed out that a measured R.M.S. or root mean square voltage or current value is a value of an alternating or pulsating voltage or current which produces the same heating effect as a direct current potential or current of the same measured value.

The voltage regulating circuit disclosed herein contemplates a direct current source. The output voltages of different types of direct current sources vary for different reasons and with different patterns of variation. That is, mechanically generated potentials may fluctuate randomly from various causes, while a storage battery produces a higher voltage when fully charged than when it is nearly discharged and its pattern of potential variation is related to time of use following charge, as well as to the current drain to which it is subjected during its use. While the circuit herein disclosed is not necessarily limited to any partcular type of variable potential D.C. source, its merits and qualifications are well exemplified in an application in which its high efficiency, trouble free performance and instantaneous response characteristics are utilized to maintain substantially uniform illumination from a preselected light source over an exceptionally long period of time from a given battery power source.

Thus, in the disclosed apparatus, and with the aid of solid state control elements which are substantially instantaneous in their operation and utilize extremely small amounts of energy in the performance of their switching and control functions, R.M.S. voltages are controlled from a preselected reference source as functions of applied potential and the time of application of the potential, rather than through electrical components, such as resistors, which introduce power losses in heat dissipation or work performed in part other than the final load for which the regulating circuit is devised.

One of the objects of this invention is to provide a high efficiency voltage regulating circuit utilizing solid state switching components and having a voltage reference element which functions independently of source voltage for establishing a reference potential against which a preselected R.M.S. voltage is compared for control purposes.

Another object of the invention is to provide a highly efficient voltage regulating circuit in which any tendency toward variations from a predetermined voltage standard are magnified by amplification and are effective to produce substantially instantaneous response within the circuit to maintain the circuit output within very close limits relative to the voltage standard.

This invention also has within its purview the provision of a voltage regulating circuit in which the durations of pulsations from a variable voltage source are timed to produce a resultant substantially constant R.M.S. voltage for application to an output load.

Considered more specifically, the voltage regulating circuit of this invention comprehends a filter connected to, but not in the circuit to a load and including inductive and capacitive elements which establish an average voltage value from pulses applied thereto and to the load, and which functions in conjunction with a resistance net in which instantaneous values voltage are compared to a preestablished reference potential.

The voltage regulating circuit of this invention further has within its purview the provision of a T-type impedance net which is adapted to operate with very low power loss for the comparison of an established fixed voltage to an average voltage value having a relation to the time and magnitude of potential pulses applied to the load for effecting the production of a predetermined R.M.S. voltage which is applied to a load through the regulating circuit.

As another object, the invention comprehends a voltage regulating circuit in which a filter incorporating an inductive element is utilized and in which filter a semiconductor device prevents voltage surges from the inductive element from interfering with the voltage regulation functions of the regulating circuit.

Other objects and advantages of my invention will be apparent from the following description and drawing in which the single figure is a schematic diagram of a voltage regulating circuit which embodies a preferred form of the invention.

In the exemplary embodiment of this invention which is shown and described herein for illustrative purposes, a high efficiency voltage regulating circuit is depicted in a form in which the voltage of a power source, such as a battery 10 is controlled in a manner such that a voltage of substantial constant or uniform R.M.S. value is supplied to a load which, in the present instance, is a light bulb 12 preselected to afford a predetermined elimination. As will be readily understood, a power source, such as a storage battery, having a predetermined normal or rated voltage will actually vary in its output voltage from a voltage value appreciably above the normal or rated value when it is fully charged to a voltage materially below the normal or rated value when the battery has been discharged to some low limit of operative usefulness. For example, a battery having a normal or rated voltage of 12 volts may be charged to an extent such that its initial operating voltage will be approximately 18 volts. Then, in a normal adaptation and use, the battery may be usable for the performance of its intended output until its condition of discharge has reached a point at which its output voltage is of the order of 9 volts. In an adaptation such as that disclosed, the load which is the light bulb 12, may be preselected to provide a desired illumination or brilliance when a voltage having an R.M.S. value of something less than 9 volts is supplied thereto.

Under conditions such as those exemplified herein, it is the purpose of the disclosed voltage regulating circuit to maintain the R.M.S. value of the voltage supplied to the light bulb 12 at a substantially constant and uniform R.M.S. value affording the desired illumination, whether the battery is fully charged or discharged to a predetermined extent such that its output voltage is some predetermined amount below normal. In addition, it is the purpose of the disclosed circuit to effect such regulation of the load voltage with very low power loss in the circuit and for any purpose other than that of translating the electrical energy of the battery into illumination.

In the circuit shown in the accompanying drawing, one side of the battery 10 is connected to ground at 13, while one side of the light bulb 12 is connected to ground at 14, thereby providing one direct connection between the power source and the load. Solid state switching devices, such as transistors 15 and 16, and accompanying resistors 17 and 18 are suitably connected together and in series with leads 19 and 20 between the battery 10 and load 12 to form a series switch 22 of low resistance between the battery and load. This series switch provides a low resistance path for current flow between the battery and load which may be opened and closed during the operation of the circuit.

When the circuit is closed between the battery 10 and the light bulb load 12 through the series switch 22, direct current flows to the load from the battery. Also, when the circuit from the battery to the load is broken by the series switch 22, there is no current flow therebetween. In the disclosed circuit, the load is practically entirely resistive, and without reactance, so that the current build-up and decay in the load are substantially instantaneous with respect to the closing and opening of the series switch 22. In any instance, however, it may be understood that upon the closing and breaking of the circuit through the series switch 22, the intermittent flow and interruption of current through the load results in a heating effect in the load which is the resultant of both the potential of the battery and the durations of the times of current flow and interruption. For example, when the times of current flow and interruption are equal, the average value of current flow to the load is half of the peak value of current flow to the load. Another factor which enters into the operation of the load is that the load tends to integrate the current flow in the types of loads herein considered, inasmuch as the heating and cooling cycles of the light bulb filament do not follow the instantaneous changes of current flow therethrough, whereby the filament tends to maintain a heated condition during the periods in which there is no current flow, particularly when the interruptions are of short duration. Thus, with the type of circuit disclosed herein, the timing of the on and off cycles of current flow to the load may be such that they result in the provision of R.M.S. values of current and voltage which maintain a predetermined heating value and illumination in the preselected light bulb which constitutes the load.

It may be observed and understood that a low resistance conductive path between the power source and the load, as in the disclosed circuit, avoids the use of resistance type control of load voltage, and thereby eliminates heat or power loss in the circuit between the power source and load. Instead, the level of illumination or output of the load is maintained at an R.M.S. value by opening and closing the series switch 22 which is interposed between the power source and the load. For effecting the control of the on and off times of the series switch 22 in a manner to maintain a fixed R.M.S. voltage across the load in the disclosed circuit, a voltage reference circuit 23 establishes a fixed voltage which is independent of the source voltage from a maximum value of the source voltage to a predetermined minimum source voltage which is below normal. Along with this voltage reference circuit 23, a filter 24, a curve fitting circuit 25, an error amplifier 26 and a trigger circuit 27 are utilized, as will be more fully described.

The filter 24 includes an inductance 28 and a capacitor 29 which have inherent resistance which is designated by a resistor 30. One end of the inductance 28 is connected through the resistor 30 and a lead 32 to the lead 20 between the series switch 22 and one side of the load 12. The other side of the inductance 28 is connected to ground at 33 through the capacitor 29. Being connected in the manner disclosed, the size of the inductance 28 and the capacity of the condenser 29 are preselected to effectively maintain an average direct current potential at the point 34 between the connected ends of the inductance 28 and condenser 29 which is substantially uniform and embodies only negligible ripple when the series switch 22 makes and breaks the circuit to the load for maintaining a substantially uniform R.M.S. voltage at the load. A semiconductor device 35 is connected to the lead 32 between the load and the inductance 28 and to ground at 36 to effectively dissipate current surges which occur when the circuit to the inductance 28 is broken by the series switch 22.

The curve fitting circuit 25 includes resistors 37 and 38 which are connected in series to form the cross portion of a T. A potentiometer 39 and resistor 40 are connected in series to form the stem portion of the T, with one end of the potentiometer 39 connected to a lead 42 which connects the resistors 37 and 38 together. The end of the resistor 40 remote from the cross portion of the T and the potentiometer 39 is connected to ground at 43.

The point 34 of the filter circuit 24 is connected to the end of the resistor 37 remote from the lead 42, whereupon the average voltage value from the filter 24 is applied to one end of the cross portion of the T-type resistance network which comprises the curve fitting circuit 25. The end of the resistor 38 opposite the lead 42, which resistor provides the other side of the cross portion of the T-network 25, is connected through a lead 44 to the lead 19, which latter lead connects the power source to the series switch 22. Thus, one side of the cross portion of the T-network has applied thereto an average voltage from the point 34, while the other side thereof has the maximum or source voltage applied thereto. In the T-network, it may also be observed that the potentiometer 39 is provided with a variable tap 45.

The reference circuit 23, which provides a fixed reference voltage which, in this instance, is desirably below the normal voltage of the power source 10, includes a Zener diode 46 and a resistor 47 which are connected in series across the power source 10; one end of the resistor 47 being connected to one side of the Zener diode by a lead 48, the other side of the resistor 47 being connected to the lead 19 and one side of the power source by a lead 49, and the other terminal of the Zener diode being grounded at 50. The Zener diode, being used as such in the customary manner of using such devices, is connected in a manner opposite to that which would provide current flow therethrough in the normal direction and has a substantially fixed break-down voltage which serves as the reference potential, and which is less than the normal voltage of the source 10 by a preselected amount. Being thus connected, the total voltage drop across the resistor 47 and the Zener diode 46 is always equal to the potential of the source, but the voltage drop across the Zener diode remains constant, while the voltage drop across the resistor 47 is always equal to the difference between the constant voltage drop across the Zener diode and the potential of the power source. Thus, the reference voltage across the Zener diode 46 remains constant, while the voltage across the resistor 47 varies in an amount dependent upon the source voltage at any particular time.

In the series switch 22, the solid state switching devices 15 and 16 are PNP type transistors. The transistor 15 has its emitter 52 connected to the lead 19 and its collector 53 connected to the load through the lead 20. The base 54 of the transistor 15 is connected to the emitter 55 of the transistor 16, the collector 56 of which transistor is connected to the lead 20. The resistor 17 is connected to the emitter 52 and base 54 of the transistor 15, while the resistor 18 is connected to the emitter 52 of the transistor 15 and to the base 57 of the transistor 16.

A main control switch 58 for starting and stopping the operation of the disclosed circuit has one terminal connected to the lead 19 through a lead 59 and has its other terminal connected to the collector 60 of a solid state switching device in the form of an NPN type transistor 62 through a resistor 63 in the trigger circuit 27. The base 57 of the transistor 16 in the series switch 22 is connected to the collector 64 of a solid state switching device in the form of an NPN type transistor 65 through a resistor 66. The base 67 of the transistor 65 is connected to the collector 60 of the transistor 62 through a resistor 68. Also, the base 67 of the transistor 65 is connected to ground at 69 through a resistor 70. The emitters 72 and 73 of the transistors 62 and 65 respectively are connected together and to ground at 74 through a resistor 75.

The base 76 of the transistor 62 in the trigger circuit 27 is connected through a lead 77 to the collector 78 of a solid state switching device in the form of a PNP type transistor 79 which comprises a part of the error amplifier 26. The collector 78 of the transistor 79 in the error amplifier is also connected to ground at 80 through a resistor 82. The emitter 83 of the transistor 79 is connected to the lead 19 through a diode 84 which determines the potential on that emitter as practically equal to that of one terminal of the source 10. The emitter 83 of the transistor 79 is also connected to the base 85 of that transistor through a resistor 86. Another resistor 87 is also connected to the base 85 of the transistor 79 and to the collector 88 of a solid state switching device in the form of an NPN transistor 89. The collector 90 of another solid state switching device in the form of an NPN transistor 92 is connected to the emitter 83 of the transistor 79 through a resistor 93. The base 94 of the transistor 92 is connected to one side of the Zener diode 46 through a lead 95, so that its potential is determined by the reference voltage across the Zener diode 46. The emitters 96 and 97 of the transistors 92 and 89 respectively are connected together and to ground at 98 through a resistor 99. The base 100 of the transistor 89 is connected through a lead 102 to the variable tap 45 on the potentiometer 39, so that the voltage applied thereto is that selected at the variable tap 45 from the curve fitting circuit 25. Thus, it may be observed that the potential of the base of the transistor 92 in the error amplifier is determined by the constant reference voltage, while the potential on the base 100 of the transistor 89 in that error amplifier is determined by a selected voltage from the curve fitting circuit.

When the main manually controlled switch 58 of the disclosed circuit is open, the transistors 15 and 16 are nonconductive and no potential is applied to the load 12 from the power source 10. When the switch 58 is initially closed the resulting potential applied to the base 67 of the transistor 65 renders that transistor conductive, whereupon current flow through resistors 18 and 66 changes the potential of the base 57 of the transistor 16 to make the transistor 16 conductive. Current flow through the transistor 16 and resistor 17 causes the transistor 15 also to become conductive, whereupon the load 12 is energized from the power source through the transistors 15 and 16. At the same time the potential is applied to the load 12, it is also provided to the filter 24, inasmuch as the load 12 and filter 24 are effectively connected in parallel across the power source 10 and each receives its current through the series switch 22. However, with a resistive and nonreactive load, such as the light bulb 12, the load voltage builds up substantially instantaneously when the series switch 22 is closed and diminishes substantially instantaneously when the series switch 22 is opened. The intermittent and rapid pulses of current flow to the light bulb 12 are effectively integrated by the light bulb as a result of the retention of heat in the filament during the off periods of the current, whereby the resultant illumination is dependent upon the R.M.S. value of the voltage pulses applied to the load. On the other hand, the tendency of the inductance 28 in the filter circuit 24 to oppose potential changes and the charging of the condenser 29 of the filter circuit through the inductance 28 provide or establish an average direct current potential at the point 34 in the filter which is a resultant of both the instantaneous source voltage and the times during which the circuit is opened and closed through the series switch 22.

It may be observed that during the operation of the disclosed circuit, the T-type resistive network of the curve fitting circuit 25 has the average voltage across the condenser 29 from the point 34 to ground at 33 applied thereto across the resistors 37 and 40 in series circuit relationship to the potentiometer 39. At the same time, the full or maximum source potential is applied to the curve fitting circuit across the resistors 38 and 40 in series circuit relationship to the potentiometer 39. In this circuit relationship, the variable tap 45 on the potentiometer 39 is set at a position which provides an R.M.S. voltage which is comparable to the fixed reference voltage across the Zener diode 46. This selected R.M.S. voltage, like the reference voltage across the Zener diode 46, is less than the normal voltage of the power source 10.

During the operation of the circuit, if the selected voltage determined by the position of the variable tap 45 on the potentiometer 39 is less than the reference voltage across the Zener diode 46, the transistor 92 is conductive and the transistor 89 is nonconductive, and the series switch 22 remains closed to apply potential from the source 10 to the load 12. As long as the transistor 15 remains conductive to apply potential from the source to the load, the voltage at the point 34 of the filter will rise. It should be kept in mind that the voltage applied to the end of the cross portion of the T-type network opposite the point 34 remains substantially constant at the voltage of the source, within reasonable limits of time and battery life. As the voltage at the point 34 of the filter is applied to one end of the cross portion of the T-type network increases, the voltage at the variable tap 45 of the potentiometer 39 also increases. When the voltage at the variable tap 45 becomes greater than the reference voltage across the Zener diode 46, the transistor 89 becomes conductive. Current flow through the transistor 89 effects a change of the base potential of the transistor 79 and causes that transistor to become conductive. Current flow through transistor 79 changes the base potential of the transistor 62 and that transistor becomes conductive, whereupon the current flow therethrough causes the transistor 65 to become nonconductive. When transistor 65 becomes nonconductive, transistors 15 and 16 also become nonconductive, whereupon the circuit between the source and the load is broken.

When the transistors 15 and 16 of the series switch 22 are nonconductive and no voltage is being applied to the load from the power source, the voltage at the point 34 of the filter 24 starts to drop, thereby causing a decrease of potential at the variable tap 45 of the potentiometer 39 in the curve fitting circuit. When the voltage at the variable tap 45 falls below the reference voltage across the Zener diode 46, the transistor 89 becomes nonconductive. When the transistor 89 is nonconductive, the transistor 79 becomes nonconductive and transistor 62 also becomes nonconductive. When the transistor 62 becomes nonconductive, the transistor 65 again becomes conductive to render the transistors 16 and 15 of the series switch conductive, whereupon potential is again applied from the source to the load and the cycle of operation repeats.

It may be readily understood that since the operations of the transistors are substantially instantaneous, the operations of the circuit are practically dependent upon the build-up and decay of potentials at the point 34 and the variable tap 45 in the circuit. Furthermore, the values of inductance and capacitance in the filter circuit 24 are determined to provide cycles of operation in the circuit such that the load effectively integrates the current supplied thereto, whereupon the operation of the load is dependent upon the R.M.S. value of the potentials determined by the reference voltage across the Zener diode 46 and the R.M.S. comparison voltage selected by the position of the variable tap 45 of the potentiometer 39. The error amplifier 26 effectively amplifies or magnifies the differences between the voltage selected at the tap 45 on the potentiometer 39 and that established as a reference voltage by the Zener diode 46 and controls the operation of the trigger circuit 27 to effect ultimate control of the series switch 22 which includes the transistors 15 and 16.

From the foregoing description of the operation of the exemplary circuit, it may be readily understood that the disclosed circuit functions without the aid of resistance type control elements in the load circuit which afford losses proportional to the square of the load current, and that the control elements utilized function with very low current consumption and substantially instantaneous with the aid of a resistance network operating at very low current values compared to the load for combining peak and average voltages to establish an R.M.S. voltage value for comparison to a fixed reference voltage, which comparison of voltages results in the establishment of a fixed R.M.S. voltage for the load with losses in the regulating circuit which are low compared to the energy consumed by the load, whereupon the regulating circuit functions with a very high value of efficiency.

From the foregoing, it is believed that those familiar with the art will readily recognize and appreciate the unique features and advancement of the present invention over previously known devices of this character. Further, it will be understood that while the present invention has been described in association with a particular and preferred embodiment thereof as set forth in the accompanying drawing and above described, the same nevertheless is susceptible to change, variation and substitution of equivalents without departure from the spirit and scope of this invention. It is therefore intended that the present invention be unrestricted by the foregoing description and illustration, except as may appear in the following appended claims.

I claim:

1. A high efficiency voltage regulating circuit for providing a substantially constant R.M.S. voltage value to a load from a direct current source having a potential which is subject to variation, the combination comprising a source of direct current having a voltage which is subject to variation above and below a normal value, a load having terminals to which current is supplied from said source and at which the voltage is to be maintained at a substantially constant R.M.S. value, a main "on" and "off" switch connected between said direct current source and a portion of said regulating circuit and having closed and open positions for effecting the starting and discontinuance of the operation of the said regulating circuit, first solid state switching means forming a part of a low resistance path of current flow from said source to said load, filter means including a capacitor connected across said load through an inductive element, said capacitor and inductive element having capacitance and inductance values selected to filter interrupted direct current from said source supplied thereto through said first solid state switching means and to produce therefrom a direct current potential with relatively low ripple and which has a voltage which is substantially an average value of the pulsating direct current supplied thereto, means for establishing a direct current reference voltage from said source which is below that of said source and remains substantially uniform for any source voltage within an operating voltage range for the regulating circuit, a circuit embodying connected resistors to which the voltage across said capacitor and the voltage of said source are applied and across a portion of which an R.M.S. value is obtained for comparison with said reference voltage, and second solid state switching means operable in response to differences between said R.M.S. voltage value and said reference voltage for effecting the closing and opening of the circuit to the load and filter means through the first switching means to provide a substantially constant R.M.S. voltage at the terminals of said load.

2. A high efficiency voltage regulating circuit as defined in claim 1, and wherein the substantially constant R.M.S. voltage value is below the normal voltage of said source.

3. A high efficiency voltage regulating circuit as defined in claim 1, and wherein said filter circuit includes a semiconductor device connected to provide a path for the dissipation of current flow resulting from the collapse of flux in said inductive element while preventing any material current flow in an opposite direction.

4. A high efficiency voltage regulating circuit as defined in claim 1, and wherein said means for establishing a direct current reference voltage comprises a Zener diode which is connected across said direct current source with a resistor in series therewith, 5. A high efficiency voltage regulating circuit as defined in claim 1, and wherein said connected resistors comprise a T-network with the cross portion of the T-network having the voltage at one side of said capacitor and the voltage at one side of said direct current source applied to the opposite ends thereof and the end of the steam portion of the T-network opposite the cross portion being connected to the other sides of both the capacitor and direct current source.

6. A high efficiency voltage regulator as defined in claim 5, and wherein the stem portion of the T-network has a variable tap, and said voltage for comparison with the reference voltage is that between said variable tap and the end of the stem portion of the T-network remote from the cross portion of the T-network.

7. A high efficiency voltage regulator as defined in claim 1, and wherein said second solid state switching means includes means for amplifying the differences in voltage between said R.M.S. voltage value and said reference voltage, and additional solid state switching means responsive to said amplified voltage differences for effecting operation of the first switching means to arrest and counteract the increase of said voltage differences.

8. A high efficiency voltage regulating circuit for providing a substantially constant R.M.S. voltage value to a load from a direct current source having a potential which is subject to variation, the combination comprising, in combination, a source of direct current having a voltage which may vary from a value above to one below normal, a load constituting an energy translating device which effectively integrates pulsating direct current to provide a substantially uniform output directly related to an R.M.S. voltage below the normal voltage of the source and which is applied thereto, first solid state switching means forming a part of a low resistance path for current flow from said source to said load, a low resistance filter circuit connected to said source through said first switching means in parallel relationship to said load, said filter circuit including inductance and capacitor elements in series circuit relationship to one another and proportioned in size to provide a direct current potential across said capacitor element which has a relatively small ripple component and a magnitude dependent upon the duration and magnitude of direct current pulses applied thereto from said source through said first switching means, means for establishing a reference voltage from said source which remains substantially constant at any source voltage above a predetermined minimum value, a resistance network having branches to which the voltage across said capacitor element and the voltage of said source are applied and one of said branches embodying a variable portion across which a voltage is selected for comparison in magnitude to said reference voltage, and second solid state switching means responsive to differences of a predetermined R.M.S. voltage on the load from said reference voltage for turning said first switching means on and off to provide a substantially uniform R.M.S. voltage on said load.

9. A high efficiency voltage regulating circuit as defined in claim 8, and wherein said second solid state switching means includes means for amplifying the differences in voltage between said reference voltage and that across said variable portion of the resistance network, and solid state switching means responsive to the amplified voltage differences.

10. A high efficiency voltage regulating circuit as defined in claim 8, and wherein the current flow through said filter is low compared to that through said load.

11. A high efficiency voltage regulating circuit as defined in claim 8, and wherein said resistance network is in the form of a T with the variable portion thereof in the stem portion of the T.

12. A high efficiency voltage regulating circuit as defined in claim 8, and wherein said resistance network comprises T-connected resistors forming cross and stem portions of the T and with the voltage across the capacitor element connected to one extremity of the cross portion of the T and to the end of the stem portion of the T opposite the cross portion, the voltage of said source being applied across the other extremity of the cross portion of the T and the end of the stem portion remote from the cross portion, and said variable portion being between the ends of the stem portion of the T.

13. In a high efficiency voltage regulating circuit for supplying a substantially constant R.M.S. voltage to a preselected load from a source of direct current having a voltage which is subject to variation, the combination comprising means for establishing from said source a fixed D.C. reference voltage below the maximum voltage of the source and related to the R.M.S. voltage which is to be applied to the load, low resistance solid state switching means through which the load is connected to said source, and means for effecting operation of said switching means for providing a voltage of substantially fixed R.M.S. value from the source to the load, said means for effecting operation of said switching means including additional solid state switching means and a network of connected resistors having applied to selected ones thereof the source voltage and a voltage directly related to the average voltage applied to the load, and from which a voltage is obtained for comparison to said fixed reference voltage for determining the rate and periods of operation of the first mentioned switching means to establish the R.M.S. voltage applied to the load.

14. In a high efficiency voltage regulating circuit as defined in claim 13, said network of connected resistors being in the form of a T having cross and stem portions, and wherein said source voltage and said voltage which is directly related to the average voltage applied to the load are applied across both the cross and stem portions of the T-network, and said voltage for comparison to said fixed reference voltage being that across a portion of the stem portion of the T-network.

15. In a high efficiency voltage regulating circuit as defined in claim 14, and wherein a filter including an inductance is connected between said source and said network and embodies a capacitor connected across the same portion of the network as that to which the average voltage applied to the load is applied.

References Cited

UNITED STATES PATENTS

| | | | |
|---|---|---|---|
| 3,226,630 | 12/1965 | Lampke | 323—22 |
| 3,273,043 | 9/1966 | Clarke et al. | 323—22 X |
| 3,356,930 | 12/1967 | Lupoli et al. | 323—20 |

LEE T. HIX, *Primary Examiner.*

A. D. PELLINEN, *Assistant Examiner.*